United States Patent
Warrick et al.

(10) Patent No.: US 10,271,080 B2
(45) Date of Patent: *Apr. 23, 2019

(54) METHOD OF INTEGRATING REMOTE CONTENT WITH HOSPITALITY MEDIA SYSTEM AND SET-TOP BOX THEREOF

(71) Applicant: Guest Tek Interactive Entertainment Ltd., Calgary (CA)

(72) Inventors: Peter S. Warrick, Calgary (CA); Brendan G. Cassidy, Calgary (CA); Brian W. King, Calgary (CA); Lea Lorenzo, Calgary (CA); Blake Read, Calgary (CA); Ian S. McBeth, Calgary (CA); Andrew T. MacMillan, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,663

(22) Filed: Apr. 5, 2018

(65) Prior Publication Data

US 2018/0288456 A1    Oct. 4, 2018

Related U.S. Application Data

(63) Continuation of application No. 15/583,003, filed on May 1, 2017, now Pat. No. 9,967,604, which is a
(Continued)

(30) Foreign Application Priority Data

Jun. 17, 2010  (CA) ...................... 2707202

(51) Int. Cl.
H04N 5/445         (2011.01)
H04N 21/2543   (2011.01)
(Continued)

(52) U.S. Cl.
CPC ......... H04N 21/2543 (2013.01); H04L 67/04 (2013.01); H04L 67/16 (2013.01);
(Continued)

(58) Field of Classification Search
CPC ........... H04N 21/2143; H04N 21/4126; H04N 21/42204; H04N 21/43615; H04N 21/63775
See application file for complete search history.

(56) References Cited

U.S. PATENT DOCUMENTS 7,606,873 B2   10/2009   Taylor et al.
8,356,251 B2   1/2013    Strober
(Continued)

FOREIGN PATENT DOCUMENTS

CA         2707202 C       8/2012

OTHER PUBLICATIONS

Andreas Fasbender et al.; "Phone-controlled Delivery of NGN Services into Residential Environments"; The Second International Conference on Next Generation Mobile Applications, Services, and Technologies; © 2008 IEEE; 8 pages.
(Continued)

*Primary Examiner* — Gigi L Dubasky
(74) *Attorney, Agent, or Firm* — ATMAC Patent Services Ltd.; Andrew T. MacMillan

(57) ABSTRACT

A hospitality media system includes a media system controller and a plurality of media devices located in a plurality of rooms and coupled to the media system controller. Each room has one or more in-room media devices located therein for performing a media function. A connection port allows a user of a room to establish data communications between the media system controller and a guest device. The media system controller is coupled to the connection port and configured to catalog guest content available on the guest
(Continued)

device to thereby form a guest content list, associate the guest content with one or more associated rooms at least including the user's room, and perform the media function utilizing content selected from the guest content list only on the in-room media devices located within the one or more associated rooms.

20 Claims, 9 Drawing Sheets

Related U.S. Application Data continuation of application No. 15/152,749, filed on May 12, 2016, now Pat. No. 9,661,366, which is a continuation of application No. 14/458,831, filed on Aug. 13, 2014, now Pat. No. 9,369,748, which is a continuation of application No. 13/157,520, filed on Jun. 10, 2011, now Pat. No. 8,813,138.

(51) Int. Cl.
*H04W 76/10* (2018.01)
*H04L 29/08* (2006.01)
*H04N 21/214* (2011.01)
*H04N 21/231* (2011.01)
*H04N 21/472* (2011.01)
*H04N 21/41* (2011.01)
*H04N 21/45* (2011.01)
*H04N 21/61* (2011.01)

(52) U.S. Cl.
CPC ... *H04N 21/2143* (2013.01); *H04N 21/23106* (2013.01); *H04N 21/4126* (2013.01); *H04N 21/4524* (2013.01); *H04N 21/47217* (2013.01); *H04N 21/6125* (2013.01); *H04W 76/10* (2018.02)

(56) References Cited

U.S. PATENT DOCUMENTS

| | | |
|---|---|---|
| 8,813,138 B2 | 8/2014 | Warrick et al. |
| 9,060,197 B2 | 6/2015 | Warrick et al. |
| 9,369,748 B2 | 6/2016 | Warrick et al. |
| 9,661,366 B2 | 5/2017 | Warrick et al. |
| 9,967,604 B2 | 5/2018 | Warrick et al. |
| 2003/0048757 A1 | 3/2003 | Accarie et al. |
| 2003/0169714 A1 | 9/2003 | Nakajima |
| 2005/0207340 A1* | 9/2005 | O'Neill ............... H04W 76/046 370/230 |
| 2005/0283791 A1 | 12/2005 | McCarthy et al. |
| 2006/0112171 A1 | 5/2006 | Rader |
| 2007/0162945 A1 | 7/2007 | Mills |
| 2008/0200209 A1 | 8/2008 | Cahoon |
| 2008/0279117 A1 | 11/2008 | Brisco et al. |
| 2008/0313085 A1 | 12/2008 | Kravitz et al. |
| 2009/0027222 A1 | 1/2009 | Larsson et al. |
| 2009/0070831 A1 | 3/2009 | Bardehle et al. |
| 2009/0083805 A1 | 3/2009 | Sizelove et al. |
| 2009/0125971 A1 | 5/2009 | Belz et al. |
| 2009/0165053 A1 | 6/2009 | Thyagarajan et al. |
| 2010/0100725 A1 | 4/2010 | Ozzie et al. |
| 2010/0136958 A1 | 6/2010 | Chandra et al. |
| 2010/0180312 A1* | 7/2010 | Toya ................... H04L 12/2812 725/78 |
| 2010/0191551 A1 | 7/2010 | Drance et al. |
| 2010/0332615 A1 | 12/2010 | Short et al. |
| 2011/0099589 A1* | 4/2011 | Woo ..................... H04N 7/106 725/81 |
| 2011/0099598 A1 | 4/2011 | Shin et al. |
| 2011/0314497 A1 | 12/2011 | Warrick et al. |
| 2012/0137325 A1 | 5/2012 | Ogilvie |

OTHER PUBLICATIONS

Wikipedia, "Wired Equivalent Privacy", downloaded from: http://en.wikipedia.org/wiki/Wired_Equivalent_Privacy on Aug. 20, 2013, 5 pages.

* cited by examiner

Room authentication table 900

| Authentication or identification information | User's registered room |
|---|---|
| Passkey 1 | Guest room A |
| Passkey 2 | Guest room B |
| ⋮ | ⋮ |

260 — Passkey 1
262 — Passkey 2

METHOD OF INTEGRATING REMOTE CONTENT WITH HOSPITALITY MEDIA SYSTEM AND SET-TOP BOX THEREOF

CROSS-REFERENCE TO RELATED APPLICATIONS

This application is a continuation of U.S. patent application Ser. No. 15/583,003 filed May 1, 2017, which is a continuation of U.S. patent application Ser. No. 15/152,749 filed May 12, 2016, which is a continuation of U.S. patent application Ser. No. 14/458,831 filed Aug. 13, 2014, which is a continuation of U.S. patent application Ser. No. 13/157,520 filed Jun. 10, 2011, which claims the benefit of Canadian Patent Application No. 2,707,202 filed Jun. 17, 2010. Each of these applications are incorporated herein by reference.

BACKGROUND OF THE INVENTION

(1) Field of the Invention

The invention pertains generally to hospitality media and entertainment systems. More specifically, the invention relates to integrating content on a guest device with a hospitality media system.

(2) Description of the Related Art

Guests often bring personal electronic devices with them when they stay at hotels, and these devices typically have stored therein movies, music, and other media content. One problem is there is no easy way to utilize the full capabilities of the hotel's media system to play the media stored on the guest's device. One typical solution is to use various hardware adaptor cables to reroute the analog output of the guest's device to analog input ports of speakers or the hotel TV. In this way, some limited use of the hotel's media system can be achieved. However, rerouting analog signals does not allow full integration of guest content with the hotel media system. For example, on-screen interactive media functions, screensavers, special effects, remote controls, wake-up and other alarms, and time based functions are examples of capabilities typically present on hotel media systems, but these functions cannot be performed using media content stored on a guest's own device.

BRIEF SUMMARY OF THE INVENTION

According to an exemplary configuration of the invention there is provided a method of integrating content with a hospitality media system. The hospitality media system has a plurality of media devices located in a plurality of rooms of a hospitality establishment and the media devices are coupled to a media system controller. The media devices and the media system controller are preconfigured to together provide entertainment to users in the rooms. The method includes allowing a user of a particular room, via a user interface screen displayed to the user, to configure the hospitality media system to integrate content stored on a remote device, wherein the remote device is at a location external to the hospitality media system and accessible via the Internet. The method further includes confirming, via the user interface screen, that the user agrees to pay an additional fee for an upgraded bandwidth to transfer the content from the remote guest device to the hospitality media system. The method further includes, when the user agrees to the additional fee, charging the user the additional fee and communicating with the remote device via the Internet at the upgraded bandwidth in order to transfer the content from the remote device to the hospitality media system. The method further includes playing the content on one or more in-room media devices located within the user's particular room.

According to another exemplary configuration of the invention there is provided a hospitality media system. The system includes a media system controller and a plurality of media devices in a plurality of rooms of a hospitality establishment. The media devices are coupled to the media system controller and are preconfigured with the media system controller to provide entertainment to users in the rooms. The media system controller is operable to allow a user of a particular room, via a user interface screen displayed to the user, to configure the hospitality media system to integrate content stored on a remote device, wherein the remote device is at a location external to the hospitality media system and accessible via the Internet. The media system controller is further operable to confirm, via the user interface screen, that the user agrees to pay an additional fee for an upgraded bandwidth to transfer the content from the remote guest device to the hospitality media system. The media system controller is further operable to when the user agrees to the additional fee, charge the user the additional fee and communicate with the remote device via the Internet at the upgraded bandwidth in order to transfer the content from the remote device to the hospitality media system. The media system controller is further operable to initiate playback of the content on one or more in-room media devices located within the user's particular room.

According to yet another exemplary configuration of the invention there is provided a media system controller for controlling a plurality of media devices in a plurality of rooms of a hospitality establishment. The media devices and media system controller are preconfigured to together provide entertainment to users in the rooms. The media system controller comprising one or more processors configured to allow a user of a particular room, via a user interface screen displayed to the user, to configure the hospitality media system to integrate content stored on a remote device, wherein the remote device is at a location external to the hospitality media system and accessible via the Internet. The one or more processors are further configured to confirm, via the user interface screen, that the user agrees to pay an additional fee for an upgraded bandwidth to transfer the content from the remote guest device to the hospitality media system. The one or more processors are further configured to when the user agrees to the additional fee, charge the user the additional fee and communicate with the remote device via the Internet at the upgraded bandwidth in order to transfer the content from the remote device to the hospitality media system. The one or more processors are further configured to initiate playback of the content on one or more in-room media devices located within the user's particular room.

According to yet another exemplary configuration of the invention there is provided a method of integrating content with a hospitality media system having a plurality of media devices located in a plurality of rooms of a hospitality establishment and coupled to a media system controller. The media devices and the media system controller are preconfigured to together provide entertainment to users in the rooms. The method includes allowing a user associated with a particular room, via a user interface screen displayed to the user, to configure the hospitality media system to access a remote device according to user credentials supplied by the user. The remote device is at a location external to the hospitality media system and accessible via an external network. The method further includes selecting a plurality of selected rooms with which content stored on the remote device is to be made available within the hospitality establishment, the plurality of selected rooms at least including the particular room associated with the user and an additional room. The method further includes looking up a plurality of in-room media devices located within the selected rooms, and listing only on the in-room media devices in the selected rooms a plurality of media assets available from the remote device when accessed utilizing the user credentials. The method further includes transferring one or more of the media assets from the remote device to the hospitality media system via the external network, and in response to user selections, playing the one or more of the media assets on at least one of the in-room media devices located within the selected rooms.

According to yet another exemplary configuration of the invention there is provided a hospitality media system including a media system controller; and a plurality of media devices in a plurality of rooms of a hospitality establishment, the media devices coupled to the media system controller and preconfigured with the media system controller to provide entertainment to users in the rooms. The media system controller is operable to allow a user associated with a particular room, via a user interface screen displayed to the user, to configure the hospitality media system to access a remote device according to user credentials supplied by the user. The remote device is at a location external to the hospitality media system and accessible via an external network. The media system controller is operable to select a plurality of selected rooms with which content stored on the remote device is to be made available within the hospitality establishment, the plurality of selected rooms at least including the particular room associated with the user and an additional room. The media system controller is operable to look up a plurality of in-room media devices located within the selected rooms, lists only on the in-room media devices in the selected rooms a plurality of media assets available from the remote device when accessed utilizing the user credentials, transfers one or more of the media assets from the remote device to the hospitality media system via the external network. The media system controller is operable to in response to user selections, plays the one or more of the media assets on at least one of the in-room media devices located within the selected rooms.

According to yet another exemplary configuration of the invention there is provided a media system controller for controlling a plurality of media devices in a plurality of rooms of a hospitality establishment. The media devices and media system controller are preconfigured to together provide entertainment to users in the rooms. The media system controller includes one or more processors configured to allow a user associated with a particular room, via a user interface screen displayed to the user, to configure the hospitality media system to access a remote device according to user credentials supplied by the user. The remote device is at a location external to the hospitality media system and accessible via an external network. The one or more processors are further configured to select a plurality of selected rooms with which content stored on the remote device is to be made available within the hospitality establishment, the plurality of selected rooms at least including the particular room associated with the user and an additional room. The one or more processors are further configured to look up a plurality of in-room media devices located within the selected rooms, list only on the in-room media devices in the selected rooms a plurality of media assets available from the remote device when accessed utilizing the user credentials, transfer one or more of the media assets from the remote device to the hospitality media system via the external network. The one or more processors are further configured to, in response to user selections, play the one or more of the media assets on at least one of the in-room media devices located within the selected rooms.

According to yet another exemplary configuration of the invention there is provided a method of integrating remote content with a hospitality media system. The method includes displaying a passkey on a display device coupled to a set-top box and establishing communications between a mobile device and the set-top box. The mobile device becomes associated with the set-top box as a result of performing an authentication process involving the passkey being entered into a user interface of the mobile device by a user of the mobile device. The method further includes receiving at the set-top box a location of a media asset sent by the mobile device, The media asset is stored at a remote storage location. The method further includes accessing the remote storage location via an external network by the set-top box, downloading by the set-top box a plurality of media data corresponding to the media asset from the remote storage location via the external network, and playing audiovisual content of the media asset on the display device according to the media data downloaded from remote storage location.

According to yet another exemplary configuration of the invention there is provided a set-top box for integrating remote content with a hospitality media system. The set-top box includes one or more processors configured by executing software loaded from a storage device to display a passkey on a display device and establish communications with a mobile device. The mobile device becomes associated with the set-top box as a result of performing an authentication process involving the passkey being entered into a user interface of the mobile device by a user of the mobile device. The one or more processors are further configured to receive a location of a media asset sent by the mobile device. The media asset is stored at a remote storage location. The one or more processors are further configured to access the remote storage location via an external network, download a plurality of media data corresponding to the media asset from the remote storage location via the external network, and play audiovisual content of the media asset on the display device according to the media data downloaded from remote storage location.

According to yet another exemplary configuration of the invention there is provided a non-transitory processor-readable medium comprising processor executable a plurality of instructions that when executed by one or more processors cause the one or more processors to perform steps of displaying a passkey on a display device coupled to a set-top box and establishing communications between a mobile device and the set-top box. The mobile device becomes associated with the set-top box as a result of performing an authentication process involving the passkey being entered into a user interface of the mobile device by a user of the mobile device. The plurality of instructions further cause the one or more processors to perform steps of receiving at the set-top box a location of a media asset sent by the mobile device. The media asset is stored at a remote storage location. The plurality of instructions further cause the one or more processors to perform steps of accessing the remote storage location via an external network by the set-top box, downloading by the set-top box a plurality of media data corresponding to the media asset from the remote storage location via the external network, and playing audiovisual content of the media asset on the display device according to the media data downloaded from remote storage location.

These and other embodiments and advantages of the invention will become apparent from the following detailed description, taken in conjunction with the accompanying drawings, illustrating by way of example the principles of the invention.

BRIEF DESCRIPTION OF THE DRAWINGS

The invention will be described in greater detail with reference to the accompanying drawings which represent preferred embodiments thereof, wherein:

FIG. 9 illustrates an exemplary database table for correlating authentication or identification information received from a guest device with a corresponding user's registered room.

DETAILED DESCRIPTION OF THE INVENTION

Figure 1:
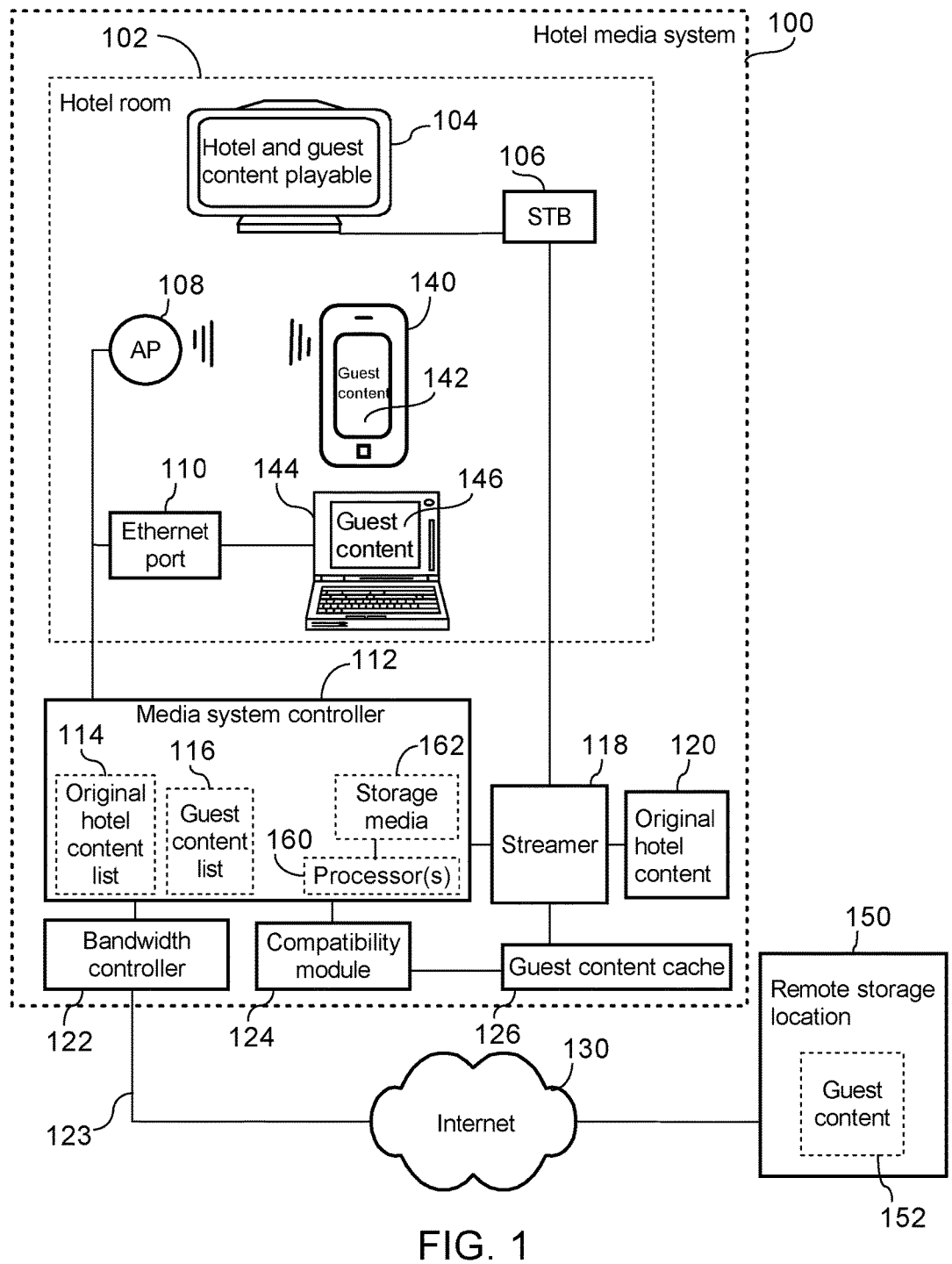
FIG. 1 is a block diagram of a hotel media system integrating guest content stored on a plurality of guest devices including a mobile phone, a laptop computer, and a remote storage location according to an exemplary configuration of the invention.

FIG. 1 is a block diagram of a hotel media system 100 integrating guest content 142, 146, 152 stored on a plurality of guest devices including a mobile phone 140, a laptop computer 144, and a remote storage location 150 according to an exemplary configuration of the invention.

In this example, a hotel room 102 includes an in-room widescreen hospitality television (TV) 104 and set-top box (STB) 106 for playing both original hotel content 120 and compatible guest content 142, 146, 152 stored and made available by the guest devices 140, 144, 150. A media system controller 112 utilizes a wireless access port (AP) 108 and a wired Ethernet port 110 to perform data communications with the mobile phone 140 and laptop 144, respectively. Additionally, the media system controller 112 is coupled to the remote storage location 150 via a virtual connection 123 across the Internet 130. A bandwidth controller 122 sets an appropriate bandwidth for the virtual connection 123 to support playback requirements of the guest content 152.

The media system controller 112 accesses the guest devices 140, 144, 150 through these connection ports 108, 110, 123 and catalogues guest content 142, 146, 152 to form a guest content list 116, which is automatically associated with hotel room 102. A compatibility module 124 checks each media asset of the guest content 142, 146, 152 to ensure it is compatible with the media system 100 and to convert the format of incompatible guest content to a compatible format. To allow on-demand playback from guest devices 140, 144, 150 and/or data connections 108, 110, 123 that may not operate at speeds sufficient for real-time playback or may not be physically connected at the time playback is desired, in this example, guest content 142, 146, 152 is cached within a guest content cache 126 until a guest staying in room 102 checks out of the hotel. Media functions of the hotel media system 100 are thereafter performed on the in-room media devices 104, 106 in hotel room 102 according to both an original hotel content list 114 and the guest content list 116. To preserve the privacy of the guest content 142, 146, 152, in-room media devices of other hotel rooms that are not associated with the guest content list 116 do not have the option of using content selected from the guest content list 116.

In an example of usage, when a movie playback function is selected within hotel room 102, the STB 106 allows the guest in hotel room 102 to play movies listed on either the guest content list 116 or the hotel's original content list 114. A streamer 118 coupled to the guest content cache 126 and the original hotel content 120 streams the selected audio/video (AV) content to the in-room television 104. All other media system functions performed by the in-room media devices 104, 106 of hotel room 102 including but not limited to video playback, audio playback, screensavers, wake up calls, alarms, timers, messaging functions, remote control operations, special effects, on-screen interactive functions, etc, may also utilize the guest content 142, 146, 152 in a similar way. From the point of view of the guest staying in hotel room 102, the guest content 142, 146, 152 is fully integrated with the hotel media system 100.

Although the mobile phone 140 and the laptop 144 are shown for convenience of illustration in FIG. 1. as being within the hotel media system 100, it should be noted they do not necessarily belong to the hotel media system 100 and may instead belong to a guest staying in the hotel room 102.

Figure 2:
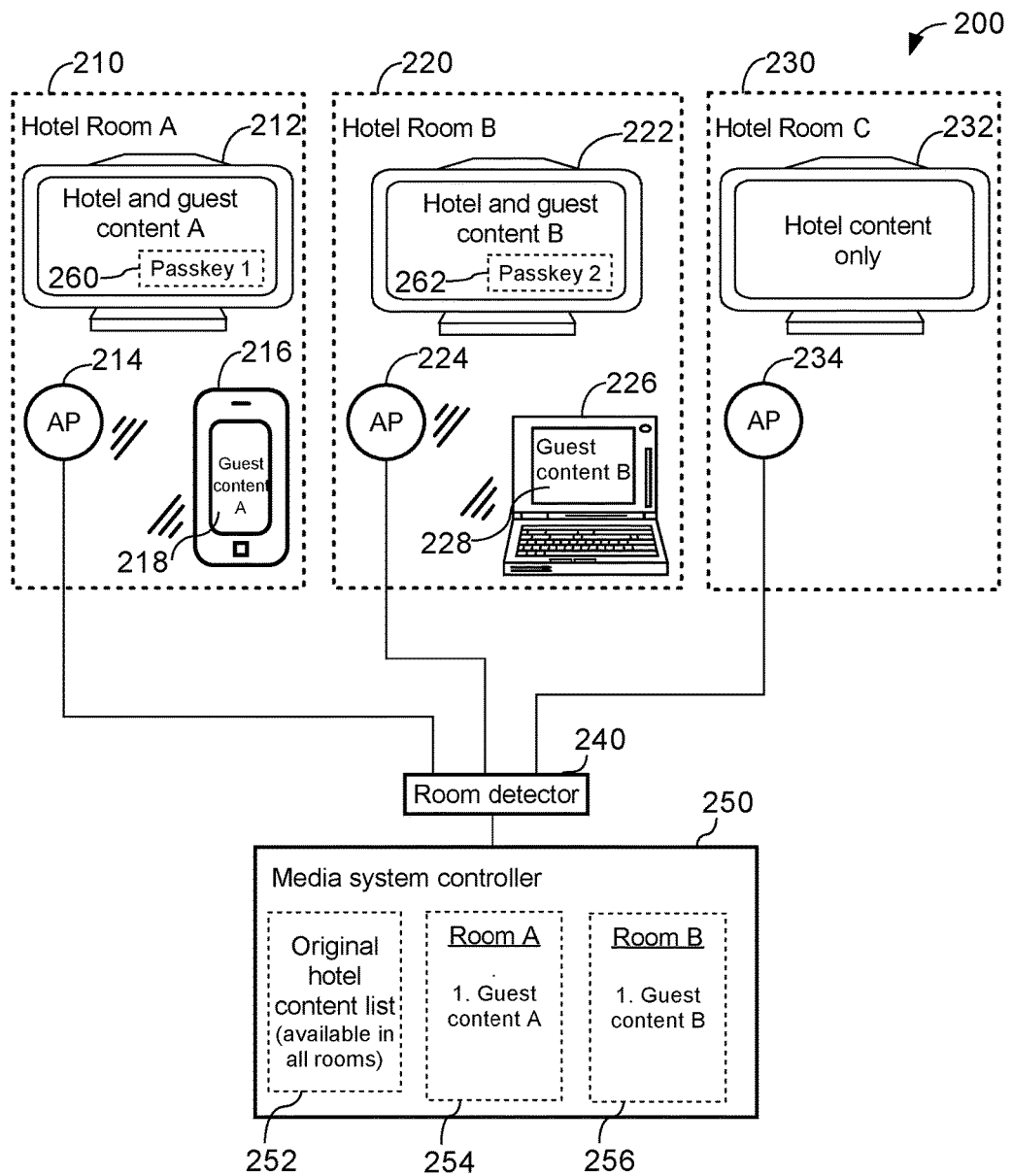
FIG. 2 is a simplified block diagram of a hotel media system illustrating how, according to one configuration, guest content from guest devices in different rooms is only available in the particular room for which each guest device is associated.

FIG. 2 is a simplified block diagram of a hotel media system 200 illustrating how, according to one configuration of the invention, guest content 218, 228 from guest devices 216, 226 in different rooms is only available on in-room media devices 212, 222, 232 in the particular room 210, 220 for which each guest device 216, 226 is associated. For example, as shown in FIG. 2, guest content A 218 is only available on the television 212 in hotel room A 210, and guest content B 228 is only available on the television 222 in hotel room B 220. Since there is no guest device associated with room C 230, only content selected from the original hotel content list 252 is available on the television 232 in hotel room C 230.

In this configuration, a room detector 240 automatically detects in which hotel room 210, 220, 230 a guest device is located in order to associate the guest device and the guest content stored therein with a particular room. The detection may be done in many ways according to different implementations. One implementation involves port detection and mapping ports to known rooms. For example, as shown in FIG. 2 each room has its own AP 214, 224, 234 connected to a different port of the room detector 240, and therefore by detecting from which AP 214, 224, 234 the connection to the guest device 216, 226 is established, the room detector 240 can associate each guest device 216, 226 with a particular room. Note that, in another example, the in-room AP 214, 224, 234 may also be integrated within an in-room STB (not shown). Similar mechanisms may also be provided for wired switch and router connection ports such as Ethernet, universal serial bus (USB), FireWire, etc.

In another embodiment, guest devices 216, 226 may be automatically associated with a particular room 210, 220 by an authentication process. For example, a passkey 260 may be displayed on the television 212 in room 210, and a user of the mobile phone 216 enters the same passkey 260 via a user interface of the guest device 216, 226 or the hotel media system 200 to thereby confirm the user is in the room. A cookie may be stored on the mobile phone 216 or a unique identification (ID) such as the phone's global system for mobile communication (GSM) subscriber identification module (SIM) number or media access controller (MAC) address may be stored within the room detector 240. In this way, the room detector 240 is able to receive authentication or identification information from the guest device 216, 226 and automatically associate the mobile phone 216 with room 210, and associate the laptop computer 226 with room 220 according to the received information. Similar techniques may be used to associate other guest devices with other rooms.

The media system controller 250 catalogues media assets in guest content A 218 available from the mobile phone 216 and forms guest content list 254. Similarly, the media system controller 250 catalogues media assets in guest content B 228 available from the laptop 226 and forms guest content list 256. Guest content list 254 is associated with hotel room A 210, and guest content list 256 is associated with hotel room B 220. Thereafter, a guest in room A 210 may perform media functions such as playing video content on the in-room television 212 according to any media asset listed on either the hotel original content list 252 or guest content list 254; and a guest in room B 220 may perform media functions such as playing video content on in-room television 222 according to any media asset listed on either the hotel original content list 252 or guest content list 256. To protect the privacy of the guests, in this configuration the media system controller 250 does not allow the guest in hotel room B to play any of the guest content A 218 because it is not listed on the guest content list 256, and vice versa. Additionally, as there is no guest content list associated with room C 230, neither guest content A 218 nor guest content B 226 is available in room C 230.

Figure 3:
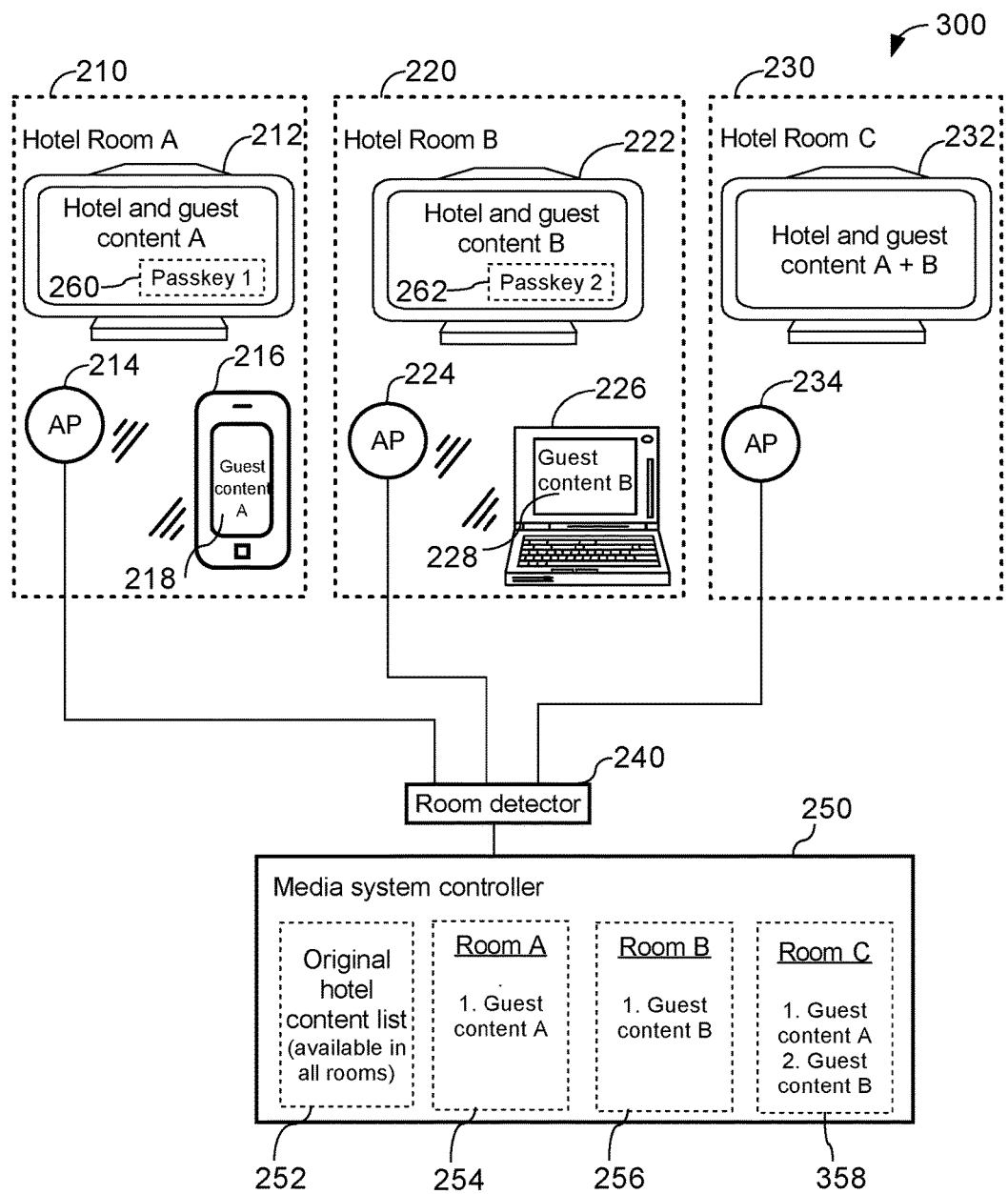
FIG. 3 is a simplified block diagram of a hotel media system illustrating how guest content may be shared with different rooms according to another configuration of the invention.

FIG. 3 is a simplified block diagram of a hotel media system 300 illustrating how guest content A 218 and guest content B 228 may be shared with different rooms according to another configuration of the invention. FIG. 3 is very similar to FIG. 2 with elements similar to as previously described in FIG. 2 shown with the same numerical labels. As shown in FIG. 3, both guest content A and B 218, 228 have now been shared with hotel room C 230. Therefore, media system controller 250 includes a guest content list 358 for room C 330 including both guest content A and guest content B.

In one configuration, guest content A 218 is automatically associated with hotel room A 210 as a result of the room detector 240 detecting that a user in hotel room A 210 established data communications between the media system controller 250 and the mobile phone 216. Likewise, guest content B 228 is automatically associated with hotel room B 220 as a result of the room detector 240 detecting that a user in hotel room B 220 established data communications between the media system controller 250 and the laptop 226. Additionally, because the user in hotel room A 210 configured a sharing option to share guest content A 218 with hotel room C 230, guest content A 218 is also associated with and included on the guest content list 358 for hotel room C 230. Likewise, because the user of hotel room B 220 configured a sharing option to share guest content B 228 with hotel room C 230, guest content B 228 is also associated with and included on the guest content list 358 for hotel room C 230. In this way, a guest in room C 230 may use the in-room TV 232 to perform media functions such as playing video content according to any media asset listed on either the hotel original content list 252 or guest content list 358, which includes both guest content A 218 and guest content B 228.

Figure 4:
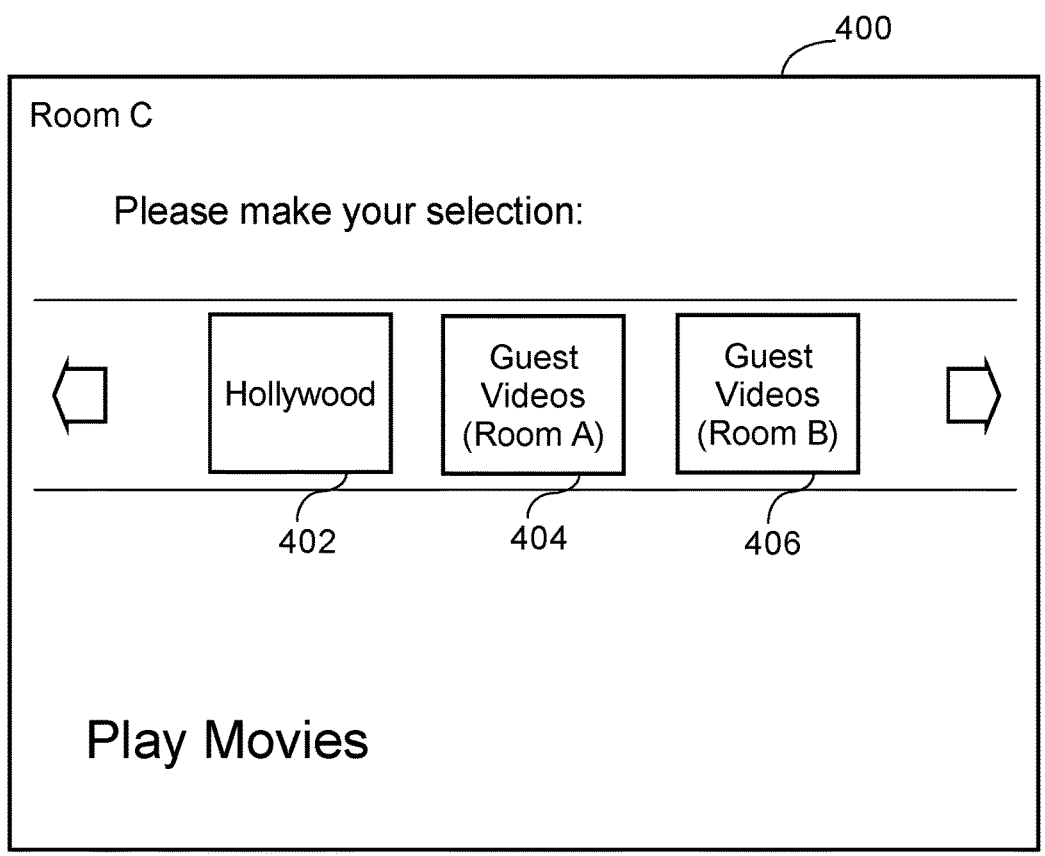
FIG. 4 illustrates a user interface that may be displayed on the television in room C of FIG. 3 to allow the media system function of playing movies to be performed according to the hotel original content list and the guest content list.

FIG. 4 illustrates a user interface (UI) 400 that may be displayed on the television 232 in room C 230 of FIG. 3 to allow the media function of playing movies to be performed according to both the hotel original content list 252 and the guest content list 358. Three buttons, including one for original hotel (Hollywood) content 402, one for guest videos from room A 404, and one for guest videos from room B 406, are available on the UI 400. Using a remote such as an in-room Infrared remote controller, a guest of room C 230 may select any of the buttons 402, 404, 406 to choose a desired content group. Subsequent UI screens may then list all the various media assets in the chosen content group. For example, if the guest selects the "Guest Videos (Room A)" button 404, a subsequent screen may list all the content available from the mobile phone 216.

The media system 300 allows a user of a room to establish data communications between the media system 300 and a guest device, and then automatically associates guest content on the guest device with the user's registered room. By default, the hotel media system 300 may keep guest content private and only available in the user's registered room for which it is associated. However, as shown in FIG. 3, guest content may also be associated with other rooms in addition to the user's room to thereby share the content.

In the simplified block diagrams of FIG. 2 and FIG. 3, there is no guest content caching or compatibility checking. For example, in order to play content listed on guest content list 254 (i.e., Guest content A 218), the mobile phone 216 must be presently connected and support speeds sufficient to transfer media content data in real-time to enable playback. The media assets in guest content A 218 must also be compatible with the hotel media systems 200, 300. In another configuration, in order to overcome these limitations, a more detailed implementation supporting guest content caching and compatibility checking/conversion such as that shown in FIG. 1 may be utilized. Additionally, virtual connections across an external network such as the Internet 130 shown in FIG. 1 may be utilized to integrate content stored on remote guest devices 150 with the media systems 200, 300.

Figure 5:
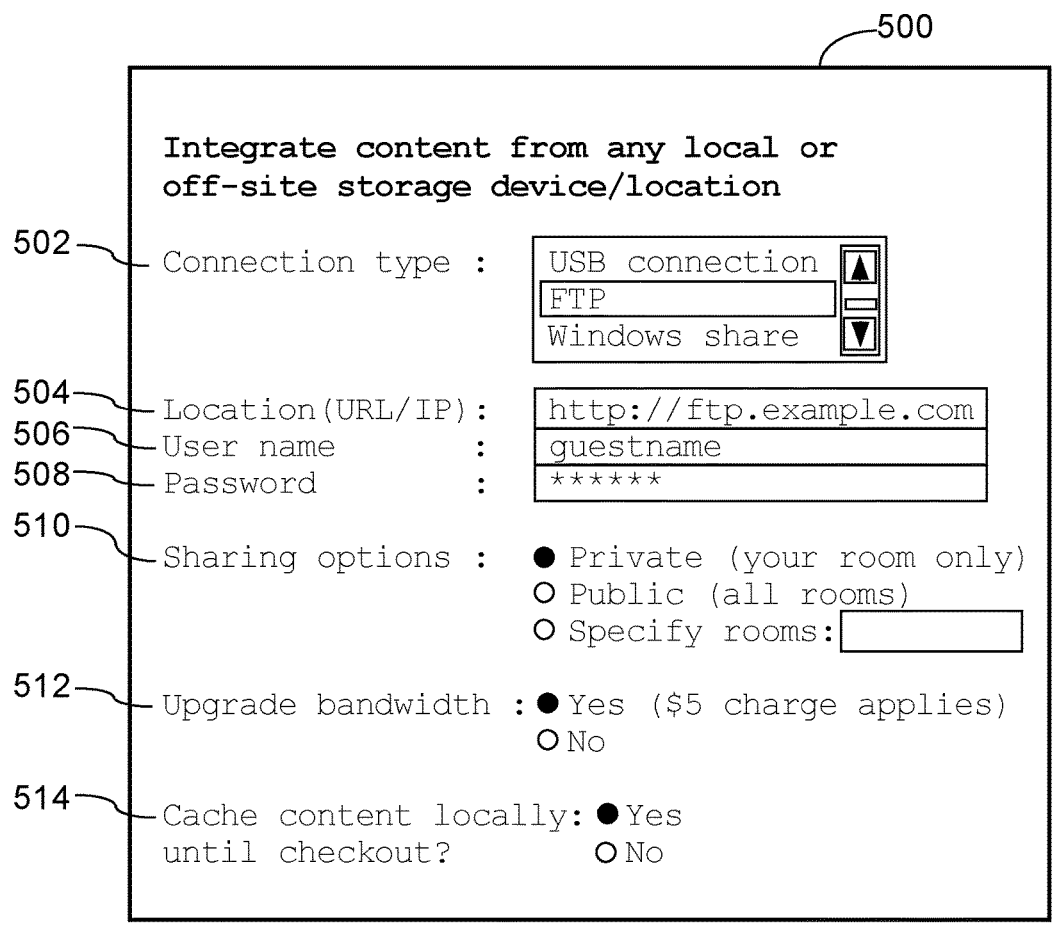
FIG. 5 illustrates a user interface screen for configuring a hotel media system to integrate content from a guest device according to an exemplary configuration of the invention.

FIG. 5 illustrates an exemplary UI screen 500 for allowing a user of a hotel room to initiate data communications between the hotel media system 100 and a guest device, and to configure the hotel media system 100 to integrate content from the guest device. A first parameter setting 502 allows the user to select a connection type. Various connection types may be supported by the media system including but not limited to USB, FireWire, file transfer protocol (FTP), Windows shares, HTTP shares, proprietary online storage providers, etc. According to the connection type selected, other parameters such as a location universal resource identify (URL) or internet protocol (IP) address location 504, user name 506, and password 508 may be configured in order to allow the hotel media system to automatically authenticate itself with the guest device. Sharing parameters 510 allow the content on the guest device to be associated with only the user's own room (private), all rooms (public), or with an individually specified list of rooms. Since, in the example shown in FIG. 5, the connection type is a virtual connection 123 to a remote storage location 150, an option 512 is provided to upgrade the bandwidth available to connect to the Internet in order to support the transfer speeds necessary to transfer data from the remote location in a reasonable amount of time. A final option 514 is provided to allow the configuration of internal caching of the content until guest check out. This may be useful to allow real-time playback without requiring a constant connection to the guest device or high transfer speeds. However, due to privacy concerns, some guests may not wish to cache content within the hotel media system so the user is given the option 514.

Figure 8:
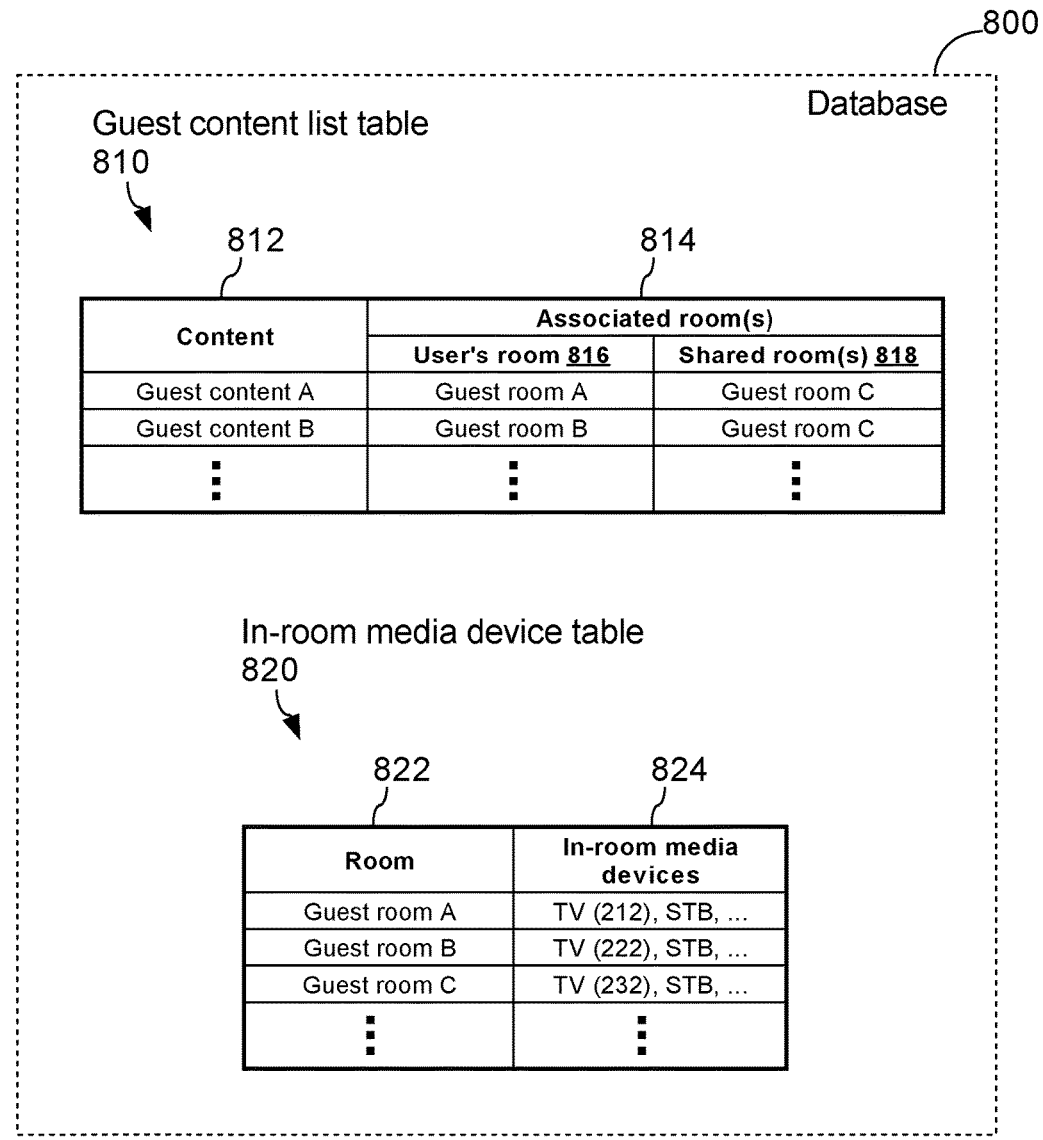
FIG. 8 illustrates an exemplary database structure for storing the guest content list and correlating each hotel room with one or more in-room media devices for use with the hotel media system of FIG. 3.

FIG. 8 illustrates an exemplary database structure 800 for storing the guest content lists 254, 256, 358 and correlating each hotel room 210, 220, 230 with one or more in-room media devices 212, 222, 232 in the media system 300 of FIG. 3.

With reference to the guest content lists 254, 256, 358 of FIG. 3, in this configuration, the three guest content lists 254, 256, 358 are stored within a single guest content list table 810. Guest content list table 810 includes a first column 812 storing different sets of guest content and a second column 814 storing the one or more associated rooms for each set of guest content. The associated rooms column 814 is divided into sub-column 816 storing the user's room and sub-column 818 storing any shared rooms. The user's room in sub-column 816 may be automatically determined by the media system controller 250. The shared rooms in sub-column 818 may be user-configured options specified using the sharing parameters 510 on UI screen 500 illustrate in FIG. 5.

In order to determine the user's room for storage in sub-column 816, the room detector 240 may detect from which room a connection between the hospitality media system and the guest device 216, 226 is established. For example, a user of hotel room A may establish a connection between the media system controller 250 and mobile phone 216 using access point (AP) 214 in hotel room A 210. Therefore, "Guest content A" in column 812 is automatically associated with "Guest room A" in sub-column 816. In another example, the user in hotel room A 210 may establish a connection between the media system controller 250 and mobile phone 216 using an on-screen UI screen 500 displayed by the media system controller 250 on the TV 212 in the user's room. The room detector 240 may then detect from which room TV 212 is located using any number of methods such as recognizing a MAC/IP address of TV 212 or performing port detection to determine in that TV 212 is located in hotel room A.

In another configuration, a STB of hotel room A 210 (e.g., similar to STB 106 shown in FIG. 1) may have a configuration setting stored therein indicating the room in which the STB is located. The STB may pass this information back to the media system controller 250. Similar methods may also be used to automatically associate "Guest content B" in column 812 with "Guest room B" in sub-column 816. Combinations of these methods may also be performed to automatically determine the user's room. For example, UI screen 500 may be displayed on the guest device 216, 226 when the guest device 216, 226 runs a hotel content integration application and the user integrates user content on the guest device by running the hotel content integration application. The user may pass back identification information to the media system controller 250 via the content integration application.

A beneficial usage scenario involves automatically associating guest content with a user's registered room even when the user performs the content integration from outside the user's registered room and/or when other automatic room detection methods are unavailable. In these situations, the media system controller 250 may receive authentication or identification information from the guest device and then automatically associate the guest content stored on the guest device with the user's room determined according to the authentication or identification information.

FIG. 9 illustrates an exemplary room authentication table 900 for correlating authentication or identification information received from a guest device 216, 226 with a user's registered room. The media system controller 250 may receive some identification information from each guest device 216, 226 corresponding to either each guest device 216, 226 itself or a user of the guest device 216, 226 and then look up in a database table to determine which hotel room 210, 220, 230 is currently associated with the received identification information. In the example shown in FIG. 9, the received identification information involves passkeys 260, 262, where each passkey 260, 262 is stored on a separate row in column 902 and has a corresponding user's registered room stored in column 904. The passkeys 260, 262 may be dynamically generated and updated as guests check in and out of the hotel and/or change their room assignments. For example, the passkey 260 for the hotel room A 210 may be changed with each reservation or guest occupancy so that guests who previously stayed in hotel room A 210 will not be able to use the same passkey 260 to integrate content for use by current guests staying in hotel room A 210.

In this configuration, when a guest checks in to hotel room A 210 (or in another situation deemed equivalent to guest check-in such as when a guest changes or upgrades to hotel room A 210), the room authentication table 900 may be populated with authentication data. For example, authentication data such as a passkey 260 correlated to hotel room A may be dynamically generated and added to columns 902 and 904. The newly generated passkey 260 may also be provided to the guest at the front desk upon check-in, or may be selectively displayed when needed on a display device in hotel room A 210 such as the in-room TV 212.

After data communications have been established between the mobile phone 216 and the media system controller 250, the media system control 250 receives a passkey 260 from the mobile phone 216 as entered by the user. This passkey 260 may be entered by the guest in order to prove they are the current guest of the particular hotel room that corresponds to the passkey 260. The media system controller 250 then performs a lookup operation matching the received passkey 260 with the same passkey 260 stored in the authentication or identification information column 902 of the room authentication table 900. In this way, the user's registered room column 904 on the matching row indicates the registered guest room currently associated with the passkey 260. The media system controller 250 may thereby associate guest content A 218 stored on the mobile phone 216 with the user's registered room in guest content list table 810 by storing "Guest room A" in column 816 on the row corresponding to "Guest content A", for example. Other types of authentication and identification information may also be mapped to a particular room in a similar way such as the guest's full name, room number, login credentials, etc.

According to the exemplary guest content list table 810 illustrated in FIG. 8, the media system controller 250 may perform any of its available media functions utilizing content selected from "Guest content A" only on the in-room media devices located within the one or more associated rooms, i.e., "Guest room A" and "Guest room C" in this example.

Referring again to FIG. 8, in order to determine which in-room media devices are located in the one or more associated rooms, the media system controller 250 may refer to in-room media device table 820. For example, the media system controller 250 may search the first column 822 to find the row(s) matching the one or more associated rooms, and then refer to the corresponding in-room media devices listed in column 824. Each in-room media device may have an unique address (e.g., MAC address, IP address, or other network address) and these addresses may be included in column 824 or stored in another table (not shown). For example, each of the TVs 212, 222, 232 may have a unique IP address, and each of the STBs listed in column 824 (not illustrated in FIG. 3) may have a unique IP address. The media system controller 250 then sends appropriate commands, metadata, and other information to only the in-room media devices of the associated room(s). In this way, the media system controller 250 performs the various media functions utilizing content selected from the guest content list only on the in-room media devices included in column 824 located within the one or more associated rooms as matched in column 822.

After the guest of hotel room A 210 checks out of the room (or changes rooms, time expires, etc), the media system controller 250 may delete the row(s) having "Guest room A" stored in the user's registered room column 904 of the room authentication table 900, and may delete the row(s) having "Guest room A" stored in the user's room column 816 of the guest content list table 810. In this way, guest content A 218 is no longer associated with any rooms of the hotel, and the guest is unable to authenticate the mobile phone 216 to integrate guest content with the hotel media system 300 because the original passkey 260 for room A 210 is no longer valid.

Figure 6:
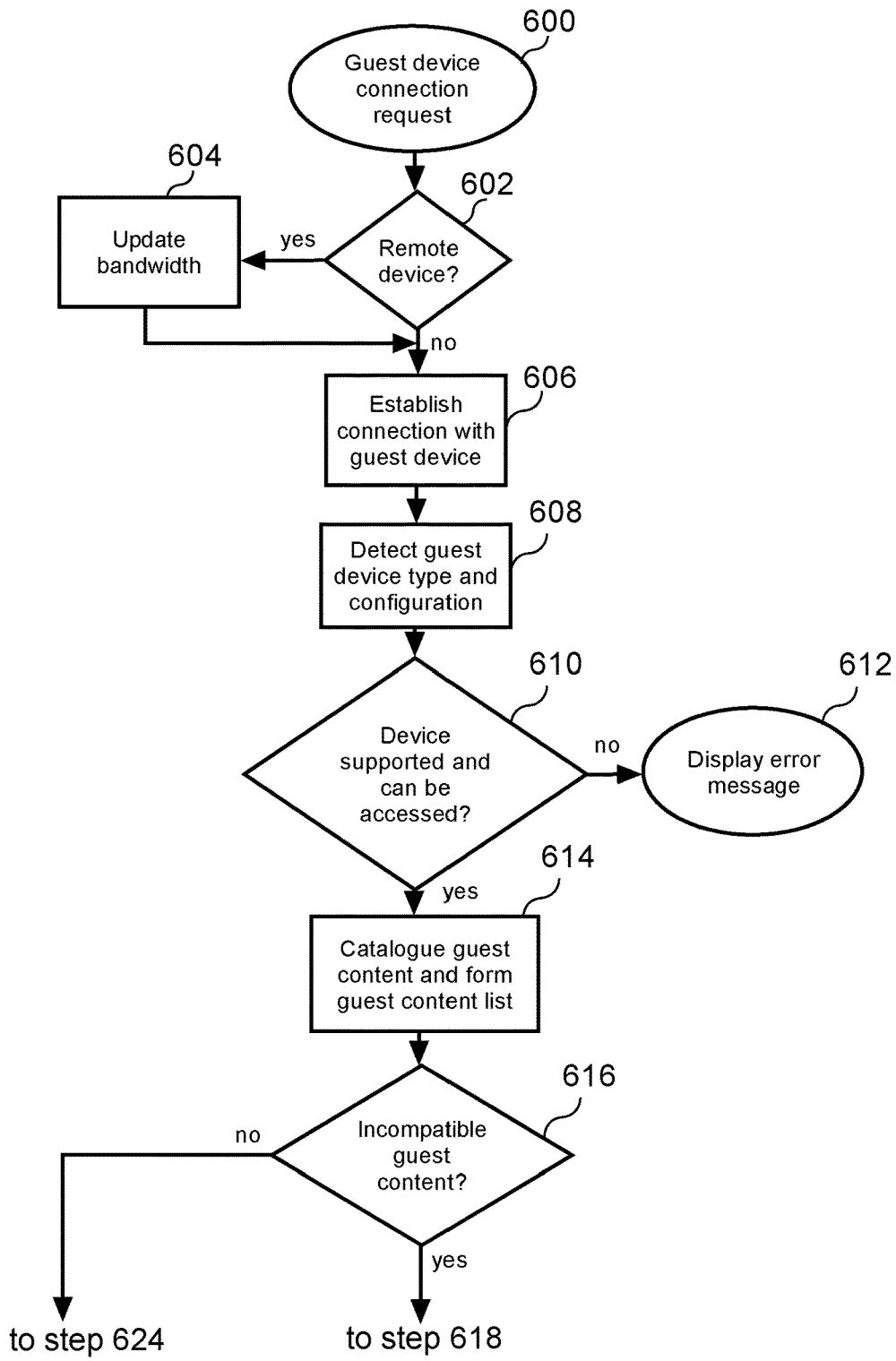
FIG. 6 and FIG. 7 together illustrate an exemplary operational flowchart of operations performed by the hotel media system of FIG. 1.
Figure 7:
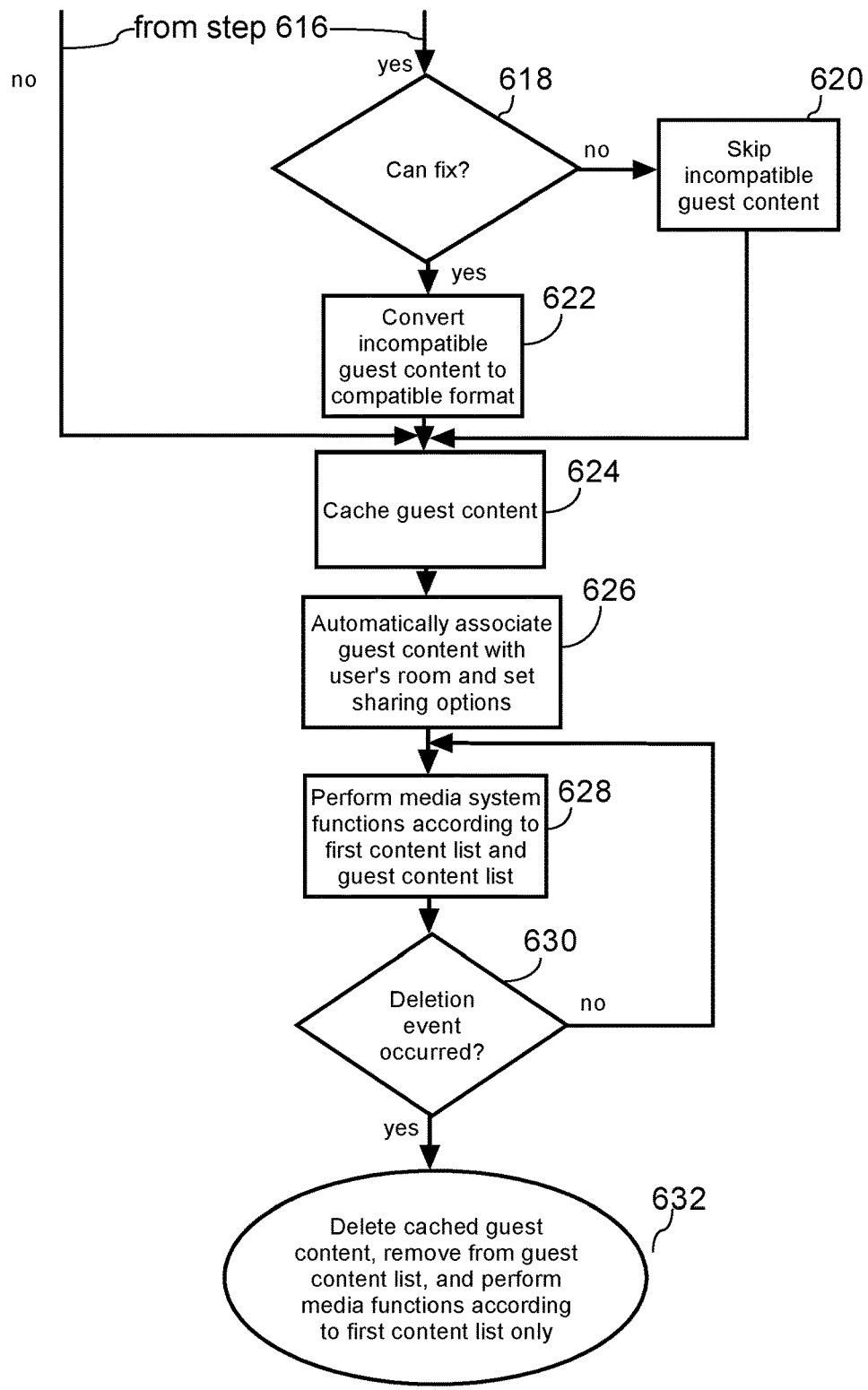

FIG. 6 and FIG. 7 together illustrate an exemplary operational flowchart of operations performed by the hotel media system 100 of FIG. 1. The steps of the flowchart are not restricted to the exact order shown, and, in other configurations, shown steps may be omitted or other intermediate steps added. In this configuration, the hotel media system 100 performs the following operations:

Step 600: The process starts when the hotel media system 100 receives a request or attempt to establish a connection to a guest device 140, 144, 150. A connection request could come from a guest staying in a particular hotel room who wishes to play content available on a device 140, 144 the guest brought to the hotel premises or that is located at a remote storage location 150. In one configuration, the connection with the hotel media system 100 may be provided at the STB 106 in the guest's room 102. In this configuration, the guest would either physically plug in a portable device such as a mobile phone 140 to the STB 106 using an available port such as USB (not shown). Alternately, the hotel media system 100 may provide Wi-Fi capabilities at AP 108 and the guest will connect to STB 106 either directly or via an available access point 108 in the hotel. In another configuration, the guest's device may not be physically in the hotel room, and instead a virtual connection 123 to an offsite storage location 150 may be requested with the media system controller 112, which itself may be physically located somewhere else in the hotel such as a server room or at a remote location. As shown in FIG. 5, the user may request the virtual connection 123 by configuring the media system controller 112 using the STB 106 UI 500 provided on the television screen 104 in the guest's room 102. When the user selects this functionality they can enter an online location of their files such as public URL or IP address 504. They can also select and configure the type of storage location 502 such as HTTP, FTP, Windows shares, NTFS shares, proprietary online storage services etc. Authentication information such as a user name 506 and password 508 can be entered as well if required.

Step 602: If the guest device is a remote storage location 150, control proceeds to step 604; otherwise, control proceeds to step 606.

Step 604: Because the guest device 150 is remotely located and accessed using an external network 130, it may be desired to upgrade the bandwidth capacity of the virtual connection 123 with the external network 130 in order to support transfer throughput speeds sufficient to download the guest content 152 from the remote location 150. In some configurations, the bandwidth may be upgraded by a bandwidth controller 122 to support real-time playback, and, in other configurations, the bandwidth may be upgraded to allow the guest content 152 to be downloaded and cached within a guest content cache 126 in the hotel media system 100. For example, if the remote location 150 is accessible via the Internet 130, the guest may be presented with an option 514 to pay an additional fee in order to upgrade the bandwidth available for the virtual connection 123 in order to download the guest content 152 from the remote storage location 150.

Step 606: A connection with the guest device is established by the hotel media system 100. As previously mentioned, the connection may be made through a wired access port 110 such as USB, FireWire, Ethernet, etc; a wireless coupling 108 such as via Bluetooth, WLAN, and Wi-Fi, etc; or a virtual coupling 123 such as connecting to an offsite storage location 150 via an external network that is not a part of the hotel media system such as the Internet 130. In general, any type of connection may be established between the hotel media system 100 and the guest device 140, 144, 150. Passwords and configuration may also be utilized to establish the connection as required. Although FIG. 1 shows the connection being established between the guest device 140, 144, 150 and the media system controller 112, in another configuration, the connection may be established directly between a local guest device 140, 144 and an in-room STB 106. In another configuration, the STB 106 may include functionality to access the remote storage location 150 and the media system controller 112 simply passes packets from the STB 106 directly to the Internet 130. Therefore, the connection with the guest device may be established utilizing any available connection port 108, 110, 123 in the hotel media system 100 whether it is wired, wireless, or virtual, and may be made by any component such as the STB 106, the media system controller 112 via a network or other connection 108, 110, the television 104 having integrated set-top box functions, etc.

Step 608: At this step, the hotel media system 100 detects the type of guest device 140, 144, 150 and confirms it can access the guest device 140, 144, 150 utilizing the configuration parameters that may have been previously entered by a user (e.g., in FIG. 5). Examples of detecting device types include detecting whether the guest device 140, 144, 150 is a USB mass storage drives, a music player, a laptop, a mobile phone, an FTP directory, etc. Examples of confirming the accessibility includes detecting if the guest device 140, 144, 150 is acting as a master or slave, whether it needs and accepts authentication, the version of the device's operating system, etc. For example, the hotel media system 100 may be pre-configured by an administrator to automatically establish connections with popular types of guest devices 140, 144, 150 that are likely to be brought to the hotel by guests.

Step 610: If the guest device 140, 144, 150 is supported and can be accessed by the hotel media system 100, control proceeds to step 614; otherwise, control proceeds to step 612.

Step 612: Because the guest device 140, 144, 150 cannot be accessed, an appropriate error message is provided. For example, if the type is unknown and no default access techniques succeed, this would mean the guest device 140, 144, 150 is not supported and cannot be accessed. In another case, if the device type is supported but refused to authenticate the hotel media system 100 with the user supplied username 506/password 508, this would also mean the guest device 140, 144, 150 cannot be accessed. In these types of situations, the hotel media system 100 is unable to integrate content from the guest device 140, 144, 150 and displays an appropriate error message to the user such as on the television screen 104. Helpful information to correct the error may also be provided according to why the problem occurred. For example, that the username 506/password 508 were not accepted, the location 504 timed out, etc.

Step 614: The hotel media system 100 now accesses the guest device 140, 144, 150 and catalogues guest content 142, 146, 152 it can detect on the guest device 140, 144, 150 to form a guest content list 116 including the guest content available on the guest device 140, 144, 150. This may involve recursing through the directory structure on the guest device 140, 144, 150 to detect and catalogue all supported and compatible media content files. Alternately, some guest devices such as media players like an iPod® or proprietary online storage systems may already provide an index of all content available on the device, and the hotel media system 100 may simply read this index to catalogue the guest content 142, 146, 152.

Step 616: The guest content 142, 146, 152 found on the guest device 140, 144, 150 during step 614 is checked for compatibility with the hotel media system 100. For example, the hotel media system may include a compatibility module 124 for determining which media assets of the guest content 142, 146, 152 are compatible (and therefore usable/viewable) either before, during or after the cataloguing in step 614. The playback compatibility could be a combination of pre-determined lists/rules and on-the-fly playback testing. It's worthwhile noting that a particular media asset may not be compatible with a particular hotel media system 100 due to servers and devices within the hotel media system 100 other than a STB 106. For example, incompatibilities with internal devices such as a video server, network infrastructure, or even room-specific devices like the TV model. Playback compatibility may be important because incompatible guest content could prevent a guest from using or configuring a media asset to obtain expected results. In these situations, an error may be caused or unexpected behavior encountered. For example setting a wakeup alarm to an unsupported audio/video type may prevent the wakeup alarm from operating as expected and may cause a guest to miss an important business meeting. Likewise, setting a screensaver to an unsupported graphic format may prevent the screensaver from operating as expected and may cause burn-in or other damage to the television 104. If incompatible guest content is found, control proceeds to step 618; otherwise, control proceeds to step 624.

Step 618: If the compatibility module 124 can fix the incompatibility, control proceeds to step 622; otherwise, control proceeds to step 620.

Step 620: If there is no conversion solution available, the media asset is considered incompatible and not catalogued for use by the hotel media system 100. Therefore, incompatible guest content is skipped and not included on the guest content list to thereby prevent the problems described in step 616.

Step 622: In many cases incompatibilities may be overcome by converting, transcoding, or simply playing the media asset in a different manner than its native format. For example playing a video at 720p rather than 1080p, or compressing a large JPEG photo so it will fit on the screen. Audio/video files may be converted to a format supported by playback modes of the in-room STB 106. Other format conversions may be applied according to the content playback requirements of the hotel media system 100.

Step 624: In order to support on-demand playback and not require the connection with the guest device to be maintained, the guest content 142, 146, 152 may be cached within a guest content cache 126 in the hotel media system 100. If implemented, this step may also be user configurable to allow the user control over caching of their private content. In one configuration, the hotel media system 100 would automatically cache all the available guest content 142, 146, 152. However, since this may involve huge amounts of data, in another configuration, the guest may manually choose particular media assets of the guest content 142, 146, 152 to cache. For example, if they are planning to use the hotel media system 100 to watch a particular movie that is stored on their mobile phone 140, they may only choose to cache that particular movie in the guest content cache 126. Then, at a later time when they are ready to watch the movie, they do not need to connect the mobile phone 140 because the movie is already cached by the hotel media system 100 and is ready for playback, bookmarking, sharing, etc. In this way, a guest may "load up" the hotel media system 100 with personal content for use during the guest's stay in the hotel. Additional fees may apply for the use of caching. Also, in other configurations, caching may be automatically performed to temporarily store media assets that were converted in step 622 to a format being compatible with the media system 100.

Step 626: Sharing options for the guest content 142, 146, 152 may be configured by the guest, by hotel staff, or automatically by the hotel media system 100. Different levels of sharing and authentication may be employed according to different configurations. In one configuration, by default, the hotel media system 100 only associates guest content 142, 146, 152 with the particular room 102 for which the guest device 140, 144, 150 is associated. This ensures that guest privacy is maintained because a guest's personal movies and other content will only be playable by equipment in the guest's own room. In another configuration, the hotel media system 100 may also allow the guest to mark all or any media asset of the guest content 142, 146, 150 stored on their device 140, 144, 150 as accessible in one or more rooms in the hotel. For example, a family that has children staying in one room and parents staying in another may wish for family home movies stored on the father's mobile phone 140 to be accessible on the hotel media system 100 in both rooms. A sharing options UI 500 of the hotel media system 100 may allow content to be associated with other rooms with guest configurable sharing options 510 such as private (default), public, or only shared with specific room(s). Genres and other sharing settings may also be included to help guests browse the available content from the other guests or to automatically associate particular types of content with certain rooms. In another configuration, password(s) may be configured for all or any media asset of the guest content 142, 146, 150 and the password protected content will only be associated with and available in other rooms if the guest in the other room knows the password. Although the sharing options 510 illustrated in FIG. 5 are combined with the connection request UI 500, in other configurations, the sharing options 510 may be done in other UIs either before or after the content has been catalogued in step 614.

Step 628: The hotel media system 100 offers its regular UI control to the guest to operate the hotel's media system. The difference is that the total content available for the guest is expanded to include the guests own content 142, 146, 152. This means, when the guest wants to watch a movie or listen to music, the available choices on the hotel media system 100 will include both original hotel audio/video content 120 and the guest provided movie and audio content as is available on the guest's devices 140, 146, 152. It should be noted that the word "original" in this sense does not necessarily mean new or unique to that hotel. As shown in FIG. 4, the original hotel content 120 may include popular Hollywood movies 402. Also, if other guests had shared their content with this room, the original hotel content may also include guest content from other rooms and devices. Therefore, the media system 100 performs media functions according to both the guest content list 116 and a first content list formed by original hotel content list 114 and any other guest content that may already be shared with or available in this hotel room 102. In other words, the first content list includes all the content that is available before the guest integrates their own guest content with the hotel media system 100. The first content list may also be a list of channels available on an in-room TV or other media device in the hotel room. After integrating guest content 142, 146, 152, all the advanced features of the hotel media system 100 in the guest's room may utilize said guest content 142, 146, 152. For example, a screensaver on the TV could utilize an image stored on the guest's laptop 144, a room wake-up alarm could be configured to play a video or audio file stored on the guest's mobile phone 140, a movie could be played from the guest's offsite storage location 150, etc. In this way, all media related functions of the hotel media system 100 are integrated with the guest's own content 142, 146, 152 available on the guest's device. Additionally, if content sharing is enabled, some or all of the guest's content may also be made available to other guests in other rooms according to the sharing configuration as described in step 626.

Step 630: The hotel media system 100 continues to operate with access to the guest's device 140, 144, 150 until detecting a predetermined deletion event. In one embodiment, the predetermined deletion event may occur when a guest staying in a room 102 for which the guest device 140, 146, 150 is associated checks out. In this way, the guest's own content 142, 146, 152 will be integrated with the hotel media system 100 and available to the guest until the guest checks out of the hotel. In other configurations, the deletion event may be deemed to have occurred if the connection established in step 606 is broken such as would occur if the laptop computer 144 is removed from the Ethernet port 110, was shut off, or ran out of batteries. In other examples, the predetermined deletion event may occur when hotel staff disconnect or otherwise forbid the device, a predetermined time limit is reached, a predetermined amount of data is transferred to/from the guest device 140, 144, 150, a copyright violation is detected, etc. Combinations and permutations of the above conditions may also be utilized to define the predetermined deletion requirement. A timer may be available on a media system UI that indicates how much time until the predetermined deletion event occurs. Once the predetermined deletion event occurs, control proceeds step 632; otherwise, the media system 100 continues to integrate the guest content 142, 146, 152 by returning to step 628.

Step 632: After the predetermined deletion event, in one configuration, the media system controller 112 removes from the guest content list 116 the guest content that is no longer available, deletes the same from the guest content cache 126, and performs media functions according to only the first content list (e.g., content that was available before the guest integrated their own content). For example, if the predetermined deletion event is defined as occurring when the guest checks out of the hotel, upon checkout, all the guest content 142, 146, 152 would be deleted from the guest content list 116 and removed from the guest content cache 126. Other rooms or users for which the content 142, 146, 152 may have been shared will also no longer be able to see or utilize the guest content 142, 146, 152 with the hotel media system 100. In another configuration, if the predetermined deletion event is defined as occurring when a guest device is disconnected from the hotel media system 100, upon disconnecting the laptop 144, guest content 146 would be deleted from the guest content list 116 and the cache 126; however, guest content 142, 152 available from the mobile phone 140 and offsite storage 150 would still be available on the guest content list 116 and included in the cache 126. In another configuration, for frequent travelers to a particular hotel, the predetermined deletion event may be defined as a predetermined amount of time since their last stay in the hotel. In this way, as long as the guest continues to frequently stay of the hotel, the guest's content will be maintained and available within the hotel. Additional fees for this content storage may apply. For privacy reasons, sharing may be disabled while the guest is not staying in the hotel (current guests will not be able to see or use the stored content); however, it may be maintained in the cache 126 and a personalized guest content list 116 to be ready for when the guest returns to the hotel.

Because the hotel media system 100 fully integrates the guest's own content 142, 146, 152 as available on one or more guest devices 140, 144, 150, all the advanced functions of the media system 100 can be configured to use the guest provided content 142, 146, 152. This is advantageous because the guest devices 140, 144, 150 may not support many of the features available on the hotel media system 100 such as wide screen playback and surround sound. Additionally, because the media system 100 may also integrate content from remote online storage devices 150, guests do not need to bring any portable electronic device with them as they travel. This could be advantageous to guests that are trying to travel light or are worried they may lose portable devices they bring or risk them being stolen. Content sharing options between different rooms and guests further enhance the guest experience.

In an advantageous usage example, content is integrated with a hospitality media system such as a hotel media and entertainment system. Media devices are located in a plurality of rooms, each room having one or more in-room media devices. The media system provides entertainment to users in the rooms by performing a media function utilizing content selected from a first content list on the media devices. When integrating their own content, a user of one of the rooms establishes a connection between the media system and a guest device. The media system catalogues guest content available on the guest device to thereby form a guest content list, and associates the guest content with one or more particular rooms at least including the user's room. Thereafter, the media function is performed utilizing content further selected from the guest content list only on in-room media devices located within the particular rooms with which the guest content is associated.

An advantage of the hospitality media system and method according to an exemplary configuration is to allow users staying at a hospitality location such as a hotel to use the full capabilities of the hotel's media and entertainment system to play guest content stored on a guest device while automatically ensuring that only in-room media devices in particular room(s) that are associated with the guest content are able to access the guest content.

A further advantage is the hospitality media system may automatically associate guest content stored on a guest device for use in the room in which the user is currently registered. When the room is no longer registered to the user, the media system may automatically un-associated the guest content from the room. The process may then repeat with each future guest staying in the room. This is highly beneficial for hospitality locations such as hotels that may have thousands of rooms including guest rooms, meeting rooms, and conference rooms, and continuously arriving and departing guests, each of who may wish to perform media functions on in-room media devices using guest content stored on guest devices during their stay at the hotel.

In summary, a hospitality media system includes a media system controller and a plurality of media devices located in a plurality of rooms and coupled to the media system controller. Each room has one or more in-room media devices located therein for performing a media function. A connection port allows a user of a room to establish data communications between the media system controller and a guest device. The media system controller is coupled to the connection port and configured to catalogue guest content available on the guest device to thereby form a guest content list, associate the guest content with one or more associated rooms at least including the user's room, and perform the media function utilizing content selected from the guest content list only on the in-room media devices located within the one or more associated rooms.

In the above description, the exemplary user indication of "guest" refers to current guests in the hotel, people who are attending a conference or meeting in the hotel, staff members at the hotel, or any other person or user who may need or want to integrate content with a hotel media system. Future guests that have reservations, potential future guests that don't yet have reservations, and other users may also be given access to integrate their own content. For example, a demonstration of the technology may be available in the hotel lobby and all users would be able to integrate content from their own devices with the media system 100 and play the content on a television in the lobby to test out the system 100.

Although the invention has been described in connection with a preferred embodiment, it should be understood that various modifications, additions and alterations may be made to the invention by one skilled in the art without departing from the spirit and scope of the invention as defined in the appended claims. For example, although the invention has been described as being utilized at a hotel, the invention is equally applicable to any hospitality related location or service wishing to provide users with a media system including but not limited to hotels, motels, resorts, hospitals, apartment/townhouse complexes, restaurants, retirement centers, cruise ships, busses, airlines, shopping centers, passenger trains, etc. The various separate elements, features, and modules of the invention described above may be integrated or combined into single units. For example, the media system controller 112 and other related elements shown in FIG. 1 may be integrated within the STB 106, which itself may be integrated within the widescreen television 104. Similarly, functions of single units may be separated into multiple units.

The modules and other units may be implemented as dedicated hardware, and may also be implemented as one or more software programs executed by a general or specific purpose processor to cause the processor to operate pursuant to the software program to perform the above-described functions. For example, the media system controller 112 of FIG. 1 may be implemented by a computer server having one or more processors 160 executing a computer program loaded from a storage media 162 to perform the above-described functions. Unless otherwise specified, features described may be implemented in hardware or software according to different design requirements. Additionally, all combinations and permutations of the above described features and configurations may be utilized in conjunction with the invention.

What is claimed is:

1. A method of integrating remote content with a hospitality media system, the method comprising:

displaying a passkey on a display device coupled to a set-top box, the display device being located within a first guest room of a plurality of guest rooms of a hospitality establishment;

establishing communications between a mobile device and the set-top box, the mobile device becoming associated with the set-top box as a result of performing an authentication process involving the passkey being entered into a user interface of the mobile device by a user of the mobile device;

receiving at the set-top box a location of a media asset sent by the mobile device, the media asset being stored at a remote storage location;

accessing the remote storage location via an external network by the set-top box;

downloading by the set-top box a plurality of media data corresponding to the media asset from the remote storage location via the external network;

caching at least a portion of the media data in a cache device accessible by the set-top box;

allowing a guest of the first guest room to initiate playback of the media asset on the display device utilizing a remote control device of the hospitality media system, the remote control device being another device separate from the mobile device;

in response to the guest initiating playback of the media asset on the display device, playing audiovisual content of the media asset by the set-top box on the display device according to the media data downloaded from the remote storage location and cached in the cache device;
detecting a predetermined deletion event representing that the guest of the first guest room has checked out; and
in response to detecting the predetermined deletion event, deleting the media data corresponding to the media asset from the cache device and not allowing a future guest of the first guest room to initiate playback of the media asset on the display device after the predetermined deletion event unless the media asset is again integrated with the hospitality media system.

2. The method of claim 1, wherein the location of the media asset sent by the mobile device includes a universal location identifier (URL).

3. The method of claim 1, wherein the location of the media asset sent by the mobile device includes an internet protocol (IP) address.

4. The method of claim 1, further comprising receiving at the set-top box authentication information from the mobile device and accessing the remote storage location according to the authentication information.

5. The method of claim 1, further comprising receiving the location of the media asset from a content integration application running on the mobile device.

6. The method of claim 1, wherein the remote control device is an infrared remote controller that sends infrared signals to at least one of the display device and the set-top box.

7. The method of claim 1, wherein:
downloading the plurality of the media data corresponding to the media asset by the set-top box involves the set-top box downloading the media asset in its entity for storage in the cache device accessible by the set-top box; and
in response to the guest initiating playback of the media asset on the display device, the set-top box thereafter plays the audiovisual content of the media asset on the display device from the cache device without redownloading the media data from the remote storage location.

8. The method of claim 1, further comprising:
confirming that the user agrees to pay an additional fee for an upgraded bandwidth to transfer the media data from the remote storage location to the set-top box; and
when the user agrees to the additional fee, charging the user the additional fee and communicating with the remote storage location via the external network at the upgraded bandwidth when downloading the media data of the media asset to the set-top box.

9. The method of claim 8, wherein the upgraded bandwidth is suitable for streaming the media asset from the remote device for real-time playback.

10. The method of claim 1, wherein the external network is the Internet.

11. A set-top box for integrating remote content with a hospitality media system, the set-top box comprising one or more processors configured by executing software loaded from a storage device to:
display a passkey on a display device, the display device being located within a first guest room of a plurality of guest rooms of a hospitality establishment;
establish communications with a mobile device, the mobile device becoming associated with the set-top box as a result of performing an authentication process involving the passkey being entered into a user interface of the mobile device by a user of the mobile device;
receive a location of a media asset sent by the mobile device, the media asset being stored at a remote storage location;
access the remote storage location via an external network;
download a plurality of media data corresponding to the media asset from the remote storage location via the external network;
cache at least a portion of the media data in a cache device accessible by the set-top box;
allow a guest of the first guest room to initiate playback of the media asset on the display device utilizing a remote control device of the hospitality media system, the remote control device being another device separate from the mobile device;
in response to the guest initiating playback of the media asset on the display device,
play audiovisual content of the media asset by the set-top box on the display device according to the media data downloaded from the remote storage location and cached in the cache device;
detect a predetermined deletion event representing that the guest of the first guest room has checked out; and
in response to detecting the predetermined deletion event, delete the media data corresponding to the media asset from the cache device and not allow a future guest of the first guest room to initiate playback of the media asset on the display device after the predetermined deletion event unless the media asset is again integrated with the hospitality media system.

12. The set-top box of claim 11, wherein the location of the media asset sent by the mobile device includes a universal location identifier (URL).

13. The set-top box of claim 11, wherein the location of the media asset sent by the mobile device includes an internet protocol (IP) address.

14. The set-top box of claim 11, further comprising receiving at the set-top box authentication information from the mobile device and accessing the remote storage location according to the authentication information.

15. The set-top box of claim 11, further comprising receiving the location of the media asset from a content integration application running on the mobile device.

16. The set-top box of claim 11, wherein the remote control device is an infrared remote controller that sends infrared signals to at least one of the display device and the set-top box.

17. The set-top box of claim 11, wherein:
downloading the plurality of the media data corresponding to the media asset by the set-top box involves the set-top box downloading the media asset in its entity for storage in the cache device accessible by the set-top box; and
in response to the guest initiating playback of the media asset on the display device, the set-top box thereafter plays the audiovisual content of the media asset on the display device from the cache device without redownloading the media data from the remote storage location.

18. The set-top box of claim 11, further comprising:
confirming that the user agrees to pay an additional fee for an upgraded bandwidth to transfer the media data from the remote storage location to the set-top box; and when the user agrees to the additional fee, charging the user the additional fee and communicating with the remote storage location via the external network at the upgraded bandwidth when downloading the media data of the media asset to the set-top box.

19. The set-top box of claim 18, wherein the upgraded bandwidth is suitable for streaming the media asset from the remote device for real-time playback.

20. A non-transitory processor-readable medium comprising processor executable a plurality of instructions that when executed by one or more processors cause the one or more processors to perform steps of:

displaying a passkey on a display device coupled to a set-top box, the display device and the set-top box being components of a hospitality media system, and the display device being located within a first guest room of a plurality of guest rooms of a hospitality establishment;

establishing communications between a mobile device and the set-top box, the mobile device becoming associated with the set-top box as a result of performing an authentication process involving the passkey being entered into a user interface of the mobile device by a user of the mobile device;

receiving at the set-top box a location of a media asset sent by the mobile device, the media asset being stored at a remote storage location;

accessing the remote storage location via an external network by the set-top box;

downloading by the set-top box a plurality of media data corresponding to the media asset from the remote storage location via the external network;

caching at least a portion of the media data in a cache device accessible by the set-top box;

allowing a guest of the first guest room to initiate playback of the media asset on the display device utilizing a remote control device of the hospitality media system, the remote control device being another device separate from the mobile device;

in response to the guest initiating playback of the media asset on the display device, playing audiovisual content of the media asset by the set-top box on the display device according to the media data downloaded from the remote storage location and cached in the cache device;

detecting a predetermined deletion event representing that the guest of the first guest room has checked out; and in response to detecting the predetermined deletion event, deleting the media data corresponding to the media asset from the cache device and not allowing a future guest of the first guest room to initiate playback of the media asset on the display device after the predetermined deletion event unless the media asset is again integrated with the hospitality media system.

* * * * *